US009422495B2

(12) United States Patent
Watanabe et al.

(10) Patent No.: US 9,422,495 B2
(45) Date of Patent: Aug. 23, 2016

(54) METHOD FOR GASIFYING GAS HYDRATE AND DEVICE THEREOF

(75) Inventors: Shigeru Watanabe, Kawasaki (JP); Go Oishi, Akiruno (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 309 days.

(21) Appl. No.: 13/988,743

(22) PCT Filed: Nov. 24, 2010

(86) PCT No.: PCT/JP2010/070908
§ 371 (c)(1),
(2), (4) Date: May 21, 2013

(87) PCT Pub. No.: WO2012/070122
PCT Pub. Date: May 31, 2012

(65) Prior Publication Data
US 2013/0247466 A1 Sep. 26, 2013

(51) Int. Cl.
*C01B 3/36* (2006.01)
*C10L 3/10* (2006.01)
*F17C 11/00* (2006.01)

(52) U.S. Cl.
CPC ............... *C10L 3/106* (2013.01); *F17C 11/007* (2013.01)

(58) Field of Classification Search
CPC ....................................................... C10L 3/108
See application file for complete search history.

(56) References Cited

U.S. PATENT DOCUMENTS 5,305,714 A * 4/1994 Sekiguchi et al. ................ 123/3
2002/0003111 A1* 1/2002 Max ....................... B01D 53/62 210/703
2002/0155047 A1* 10/2002 Max ......................... B01D 3/14 422/245.1
2004/0131541 A1* 7/2004 Andersen ................... B01J 7/02 423/657
2009/0235586 A1* 9/2009 Katoh et al. ................. 48/127.9
2010/0325955 A1* 12/2010 Watanabe ................. C10L 3/06 48/78
2011/0263913 A1* 10/2011 Lee ...................... B01J 19/1806 585/15
2013/0149212 A1* 6/2013 Song .......................... B01J 3/04 422/208

FOREIGN PATENT DOCUMENTS

| | | | |
|---|---|---|---|
| JP | 2001279281 | A | 10/2001 |
| JP | 2005239782 | A | 9/2005 |
| JP | 2006138349 | A | 6/2006 |
| JP | 2006160841 | A | 6/2006 |
| JP | 2006348193 | A | 12/2006 |
| JP | 2007308043 | A | 11/2007 |
| JP | 2009242729 | A | 10/2009 |

* cited by examiner

*Primary Examiner* — Imran Akram
(74) *Attorney, Agent, or Firm* — Westerman, Hattori, Daniels & Adrian, LLP

(57) ABSTRACT

Provided are a method and a device for efficiently decomposing gas hydrate pellets and extracting gas. That is, provided is a method for decomposing gas hydrate characterized by supplying gas hydrate pellets to a decomposition vessel, damming and gathering densely the pellets on a downstream side in the decomposition vessel, and passing hot water through this pellet layer which is in a densely gathered state, to thereby decompose the pellets into water and gas.

4 Claims, 8 Drawing Sheets

(A)

(B)

METHOD FOR GASIFYING GAS HYDRATE AND DEVICE THEREOF

CROSS-REFERENCE TO RELATED APPLICATIONS

The present patent application is a nationalization of International application No. PCT/JP2010/070908, filed Nov. 24, 2010, which is incorporated herein by reference in its entirety.

BACKGROUND OF THE INVENTION (1) Field of the Invention

The present invention relates to a method for efficiently extracting gas by heating and decomposing gas hydrate pellets and a device therefor.

(2) Description of Related Art Including Information Disclosed Under 37 CFR 1.97 and 1.98

In regions where pipelines are not constructed, a method has been widely employed in which natural gas is artificially liquefied temporarily, and transported as liquefied natural gas (LNG) by dedicated ships or tank trucks. In LNG, gas in a volume approximately 600 times as much as the volume of LNG can be contained by the liquefaction. However, for the liquefaction, the raw material gas is cooled to an ultra-low temperature of −162° C. Hence, the liquefaction requires power for refrigeration, and storage facilities and the like need to have high thermal insulation performances.

Meanwhile, a gas hydrate is a hydrate which is a solid formed by a reaction of a gas with water. In the gas hydrate, the gas is trapped in a cage made of water molecules. When the raw material gas is natural gas, a mixture gas mainly containing methane is trapped, and this gas hydrate is called natural gas hydrate (NGH). NGH maintains a stable state at low temperature and high pressure, and is ordinarily in a decomposition region at normal temperature and normal pressure. Hence, NGH in land areas exists in permafrost zones, and NGH in sea areas exists below the seabed at depths of water deeper than 500 m, where high water pressures are applied.

In NGH, the gas in a volume approximately 160 times as much as the volume of NGH can be contained in the structures. In addition, NGH is known to have such a unique characteristic that NGH decomposes at a relatively low rate under atmospheric pressure and at temperatures of −10° C. to −20° C., where NGH is in a decomposition region. In this respect, the following novel natural gas transport method has attracted attention. Specifically, NGH is artificially produced, for example, at a pressure of approximately about 5 MPa and a temperature of about 5° C. Then, the NGH is cooled and depressurized, and the hydrate is stored and transported by utilizing the mild region where decomposition can be suppressed.

The hydrate itself is like powder snow (like fine powder) and bulky, and is rarely used in its original state from the viewpoints of transport efficiency and storability. The hydrate is molded with compression into a given shape and size, and is transported or stored in the form of "pellet-shaped" molded articles having diameters of, for example, 2 cm to 3 cm. Hence, in the use of the gas in the pellets as a raw material or a fuel, the pellets are heated and decomposed, and the generated gas is fed to a destination where the gas is consumed.

Here, an example of a mode of artificial production and storage of NGH is introduced. A fine powdery raw material obtained in a hydrate formation device is compressed into a pellet state by a mold or a paired-roller-type press device provided with recessed portions on surfaces thereof, and cooled to a storage temperature. The pellets have enough strength to resist destruction and collapse and to keep their shapes, even when being supplied into a large storage tank having a diameter of 30 m and a height of 60 m, for example. Hence, extraction of the gas by decomposing such firm pellets into water and gas additionally requires an efficient "regasification step."

An example of the regasification step is shown in Japanese patent application Kokai publication No. 2001-279281. According to this Document, the regasification step is configured as follows. Specifically, pellets are introduced into hot water in a horizontal and rotatable gasification container. The generated gas and water are introduced into a gas-liquid separator, and separated from each other. The gas is extracted from the gas-liquid separator, whereas the water is extracted by a pump, and returned to the gasification container after heating.

Meanwhile, Japanese patent application Kokai publication No. 2005-239782-proposes the following device. Specifically, a ring-shaped nozzle for supplying gas hydrate is disposed at an upper portion in a vertically long gasification container; a rotation shaft provided with a rotatable impeller at a lower end thereof and with an impeller for grinding at an upper portion thereof is disposed at the center in the container; a thick cylindrical heat exchanger is formed around the impeller for stirring; and a bubble separation plate is provided at a bottom portion of the container.

SUMMARY OF THE INVENTION

Problem to be Solved by the Invention

In the regasification device described in Patent Document 1, hot water, massive bodies for breaking gas hydrate, and gas hydrate pellets are supplied into the horizontal treatment container, and the gas hydrate is ground with massive bodies by rotating the treatment container itself, and gasified by heating of the hot water. Thus, gas is generated.

Hence, this device has a drawback of requiring large driving power for rotating the massive bodies and the pellets. Moreover, this device employs a configuration in which the gas hydrate pellets are ground, then mixed with the hot water, and gasified by stirring the mixture. This configuration of the device requires power for the rotation and the stirring, and moreover a space in which the pellets are suspended, resulting in extremely poor gasification efficiency. Hence, this configuration is not suitable for mass treatment of gas hydrate pellets.

Meanwhile, the device described in Patent Document 2 mentioned above is configured as follows. Specifically, in the use of this device, while hot water is circulated in the container, gas hydrate is supplied through the nozzle. The supplied gas hydrate is ground by the impeller for grinding, and mixing into the hot water. Further, the mixture is subjected to gasification with stirring at the portion surrounded by the heat exchanger, and transferred to a lower portion of the container. The hot water is extracted from a lower end of the container, and the gas generated by the gasification present at the upper portion of the container is discharged through a gas outlet pipe.

The cited device for regasifying gas hydrate requires grinding of the pellets in the container, decomposing of the ground material with mixing and stirring with hot water, and various devices such as a heat exchanger for preparing the hot water in the container. Moreover, this device has the following problems: a large amount of power is used for the grinding and stirring; and facility costs and operation costs are high. Hence, this device is difficult to employ in industry.

In this respect, the following experiments were conducted, while focusing on the arrangement of pellet aggregates and gasification efficiency.

Experiment for Checking Relationship Between Amount of Heat Transfer and Reynolds Number As shown in FIG. 4, a testing apparatus 40 was prepared which included a gasification container 30 having an inner diameter of 9.3 cm and an inner height of 20 cm, thermometers 31*a* to 31*d*, a pump 32, a water supply vessel 33, a water-temperature-gauge 34, a flow meter 35, a gas-liquid separation vessel 36, a gas flow meter 37, and a water flow measuring device 38. Pellets q of methane hydrate having diameters of 2 to 3 cm were filled at an average filling ratio of 66% (volume of pellets: 66%, volume of water and gas: 34%). Water was supplied from the water supply vessel 33 by using the pump 32, and passed through a packed bed J filled with the pellets q. The generated methane gas g was separated in the gas-liquid separation vessel 36, and discharged through the gas flow meter 37. The Reynolds number (Re) of the supplied water and the Nusselt number (Nu), which indicated the amount of heat transfer, were calculated from the experimental results, and shown in FIG. 5 as curve A.

Moreover, for comparison, curve B shows, against the Reynolds number (Re), the Nusselt number (Nu) calculated from the Ranz equation which indicates the amount of general heat transfer in a state where a solid material is filled, and curve C shows, against the Reynolds number (Re), the Nusselt number (Nu) calculated from the Ranz-Marshall equation which indicates the amount of general heat transfer of a single sphere.

The results, i.e., curve A, of the experiment in which the pellets were filled showed that when the pellets were filled and gasified, the amount of heat transfer at a Re of 250 was 2.0 times the amount of heat transfer in the filling state shown in curve B, and likewise the amount of heat transfer at a Re of 500 was 2.3 times the amount incurve B, for example. As the Re increases, the ratio there between further increases. The hot water passes through spaces among the pellets q filled in the gasification container 30, and the pellets q gradually decompose to generate gas. The gas is mixed into the hot water to form a mixed flow. Since the generated gas is added to the supplied water, the volume of the fluid increases, and the Re becomes much larger than the apparent Re calculated from the spaces among the pellets. Moreover, in the experiment, when the pellets were gasified, it was observed that bubbles were generated from the surfaces of the pellets, and moreover the generated gas collided with the surfaces of the pellets filled on the downstream side.

In the gasification of hydrate in the filling vessel, a larger amount of heat transfer is achieved than in a filling state not involving gasification, presumably because of an effect (hereinafter referred to as "a turbulent flow effect") of actively stimulating boundary layers by disturbing the flows on the surfaces of the pellets.

As described above, when hydrate pellets were put in a filled state and gasified by passing water in a single direction, the following results were obtained: the supplied water to which the generated gas was added flowed through the spaces, so that the velocity of the supplied water was increased; and moreover a larger amount of heat transfer than the amount of general heat transfer was obtained by the turbulent flow effect due to the generation of the bubbles near the surfaces of the pellets and the collision at the downstream.

When a large amount of heat transfer is achieved, this leads to a reduction of the contact area or the temperature difference between the pellets being in a solid state and the fluid being a heat source. Hence, this enables efficient gasification.

A first regasification device 10 shown in FIG. 6 is a device of a type in which pellets p are decomposed by being stirred in a suspended state in hot water h, and the pellets p receive heat while moving freely in the hot water h. In a state of the solid-liquid contact of this type, heat transfer is carried out in which the pellets p receive heat and are decomposed, while the relative positions of the surfaces of the suspended pellets p with respect to the hot water h are being changed by mechanical stirring.

FIG. 8(A) shows a model of this state. The pellets p are sufficiently spaced from each other, so that the pellets p can rotate and move. Flow of the hot water h is represented by f, vortexes are represented by v, and rotations of the pellets p are represented by arrows. The contact of the pellets p with the hot water h occurs while the pellets p are moving. Hence, the amount of heat received is determined by the relative velocities between the hot water h and the surfaces of the pellets p rotating and moving synchronously with the flow of the hot water h generated by the stirring. However, because of the synchronization, the relative velocities are hardly generated, and it can be considered that the amount of heat received is not very large.

In the thermal decomposition device shown in FIG. 6, the amount of the gas generated by the decomposition of the pellets p changes depending on the rotation speed of an impeller 2*a* and on the temperature of the hot water h. Moreover, in this form, the pellets are in a suspended state, and the generated gas only moves upward in the suspended pellets near the surface of the hot water. Hence, there is no expectation of the acceleration effect by the generated gas. Therefore, the following methods may be employed to increase the amount of heat transfer. Specifically, the gasification speed is increased by employing smaller pellets p or pellets p broken in advance to increase the contact areas with the fluid, or by increasing the size of the gasification container itself. Accordingly, the amount of gas generated is determined by the stirring speed, the sizes of the pellets p, the size of the container, and the temperature of the hot water.

A second regasification device 10A shown in FIG. 7 is configured as follows. Into a decomposition cylinder 14 constituting a decomposition unit 11, pellets p are transferred from a lower portion in a single direction along with a flow of hot water h. The pellets p are gathered densely in a clustered state by being blocked by an obstacle of a screen 16 disposed at an upper portion of the decomposition unit 14. The pellets p themselves cannot move freely, and the relative positions of the pellets p with respect to the gasification container are almost fixed. The pellets p move with slip in small ranges because of the changes in sizes or shapes of the pellets p.

In this configuration, the pellets are densely gathered with each other, and each are in a restraint state. Even in this case, flow paths formed by narrow spaces are present among the pellets p, and a mixed flow of the gas g, hot water, and water generated by decomposition of the pellets p is supplied to a gas separation unit 12 through piping 17. The water passes through a circulation path 13, a pump 20, and a heat exchanger 21, and supplies pellets p, which are supplied to the flow from a pellet supply device 22 connected to the circulation pipeline 13, to the decomposition cylinder 14 through a supply pipe 15.

The hot water h flowing through the circulation pipeline 13 including the piping 17 flows through spaces in aggregates of the pellets p in any directions as indicated by arrows, as shown in Part (B) of FIG. 8. Since the spaces are very narrow, the hot water h is forcibly brought into contact with the surfaces of the pellets. In other words, the forcibly supplied hot water h flows, while greatly disturbing interfaces with the pellets p. In the meantime, the hot water h gives heat to the pellets p, and promotes the thermal decomposition of the pellets p. It can be said that the decomposition device of this type is a warm-water-forced-contact-type decomposition device.

The fluid resistance at the passing of the hot water h through the narrow spaces among the pellets p has relationships with the sizes of the pellets p, the thickness of the layer, the flow rate and the surface state of the pellets which changes from moment to moment with the decomposition. As the fluid resistance increases, the power of the pump used for circulating the water increases. However, mechanical stirring or pre-grinding is not required unlike the first device of the stirring type shown in FIG. 6. Hence, it can be said that this type enables efficient gasification.

As described above, when the first regasification device of the stirring type and the second regasification device, i.e., the densely gathered pellet-type and hot water-forcibly passing-type regasification device are compared with each other, it can be understood that the latter device is superior in thermal decomposition performance of pellets. In addition, since the latter device is superior in regasification performance, the gasification container itself can be reduced in size, and a gasification device can be achieved which requires smaller power for mechanical stirring and grinding, and is excellent in maintainability of equipment.

A method for decomposing gas hydrate according to the present invention is configured as follows.

The method is characterized by:

supplying gas hydrate pellets to a decomposition vessel;

gathering the pellets densely on a downstream side in the decomposition vessel; and passing hot water through a layer of the pellets in the densely gathered state, to thereby decompose the pellets into water and gas.

The method is further characterized in that a screen for preventing lumps of the hydrate from flowing out and for separating water and gas generated by the decomposition is provided on the downstream side of the decomposition vessel.

A device for decomposing gas hydrate according to the present invention is configured as follows.

The device is characterized by comprising:

a decomposition vessel configured to be filled with gas hydrate pellets and to heat and decompose the gas hydrate pellets;

a gas-liquid separation tank for separating water and gas generated by the decomposition from each other;

a water tank for storing surplus water;

upper piping for connecting a mixture of the gas and the water generated in the decomposition vessel to the gas-liquid separation tank; and lower piping for heating the water in the gas-liquid separation tank with a heater and supplying the heated water through a lower portion of the decomposition vessel.

The device is further characterized in that a screen for separating the generated gas and water from the gas hydrate pellets is provided inside the decomposition vessel.

The device is still characterized in that means for heating the water supplied to the decomposition vessel is an external heater incorporated in the piping, or a heater for heating the decomposition vessel itself.

In a case where gas hydrate pellets are decomposed into water and gas, and the gas is extracted for use as a fuel or a raw material, the present invention does not require stirring power and, in some cases, grinding of pellets, which are required by the conventional device. Instead, in the present invention, hot water is supplied to aggregates of the pellets (in a densely gathered state), and the hot water is passed through the pellets by utilizing narrow spaces formed among the pellets.

The hot water flows on the surfaces of the pellets, and generates gas. The gas is mixed into the hot water, and an apparent volume of the hot water is increased, so that the hot water flows faster. Moreover, bubbles of the generated gas disturb the surfaces of the pellets on the downstream side. Presumably as a result of this, the heat transfer characteristics between the hot water and the surfaces of the pellets are improved. Accordingly, the present invention is capable of decomposing pellets much more efficiently than the conventional decomposition device of the stirring type.

Moreover, since the pellets are not stirred in the hot water, the present invention does not consume power for the stirring, and hence makes it possible to reduce operation costs. Moreover, since the heat transfer coefficient is remarkably improved, and the pellets do not have to be suspended in the gasification vessel, the device as a whole can be reduced in size.

DETAILED DESCRIPTION OF THE INVENTION

Next, a device for decomposing gas hydrate pellets according to the present invention is described with reference to the drawings.

Figure 1:
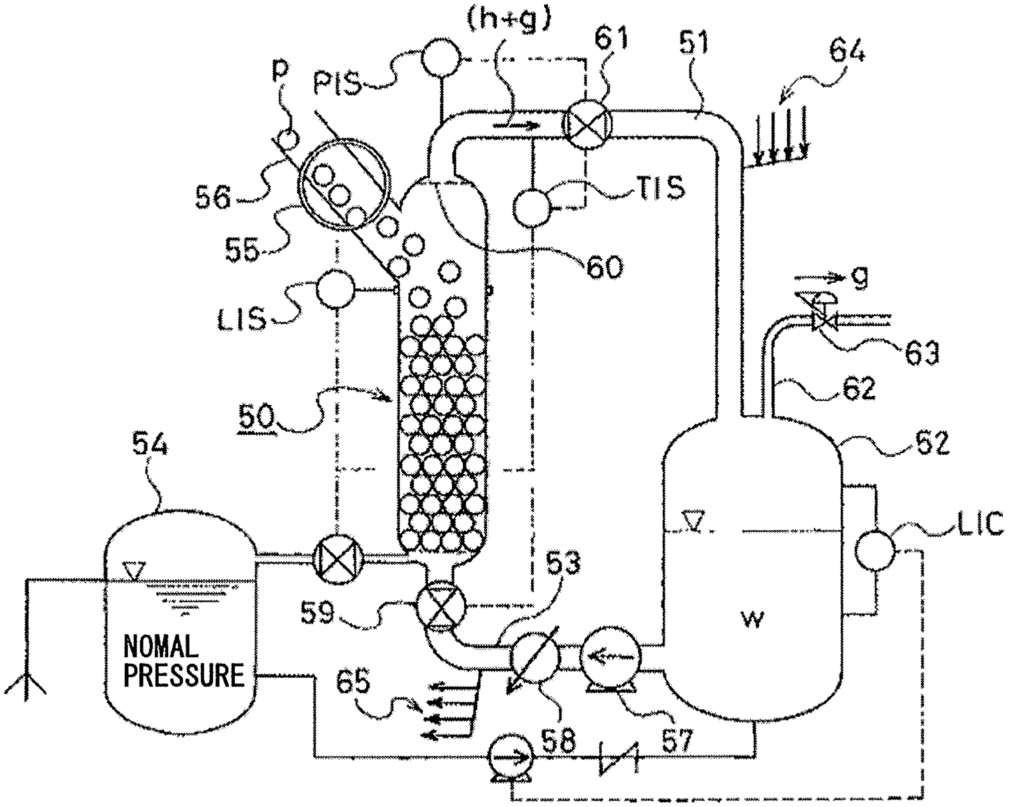
FIG. 1 is a schematic diagram of a regasification device of a first embodiment of the present invention.

FIG. 1 is a schematic diagram of a decomposition device according to a first embodiment of the invention. Piping 51 connected to an upper portion of a filling tank 50 (a decomposition vessel: 1500 mm in diameter, 4 m in height) is connected to a gas-liquid separation tank 52. A lower portion of the tank 52 and a bottom portion of the filling tank 50 are connected by piping 53. In addition, the bottom portion of the filling tank 50 is connected to a normal pressure tank 54 for storing water.

Pellets p (2 to 3 cm in diameter) supplied from an unillustrated pellet production device or pellet storage tank (for example, normal pressure) are supplied and filled into the filling tank 50 through a large-diameter supply pipe 56 equipped with a large rotary valve 55 (pellet supply unit)

intermittently by the rotation of the rotary valve 55. After that, the rotary valve 55 is closed, and a batchwise decomposition treatment is conducted.

Hot water h stored in the gas-liquid separation tank 52 maintained at a high pressure is supplied to the bottom portion of the filling tank 50 through a pump 57, a heat exchanger 58, and a valve 59. The hot water h decomposes the pellets p by coming into contact with the pellets p, and flows in the piping 51 located above as a mixed flow (g+h) of the generated gas g and the hot water h. A screen 60 is provided at a top portion of the filling tank 50, and the pellets p being decomposed come into contact with the hot water h, while being blocked by this screen 60. Consequently, the pellets p are decomposed completely.

An automated flow adjustment valve 61 is provided in the piping 51. An automated flow adjustment valve 59 is provided in the piping 53. An operation of decomposing the pellets p is performed, while the flow rate of the hot water h is controlled by cooperation of these valves depending on the amount of the pellets p remaining in the filling tank 50. Water w, which had formed the pellets p, is generated with the decomposition of the pellets p. The water w flows into the gas-liquid separation tank 52. In the tank 52, the gas g and water w are separated from each other. The gas g is supplied thorough piping 62 and an automated control valve 63 to a destination where the gas g is used. Note that reference signs 64 and 65 denote multiple lines of single-kind devices.

Figure 2:
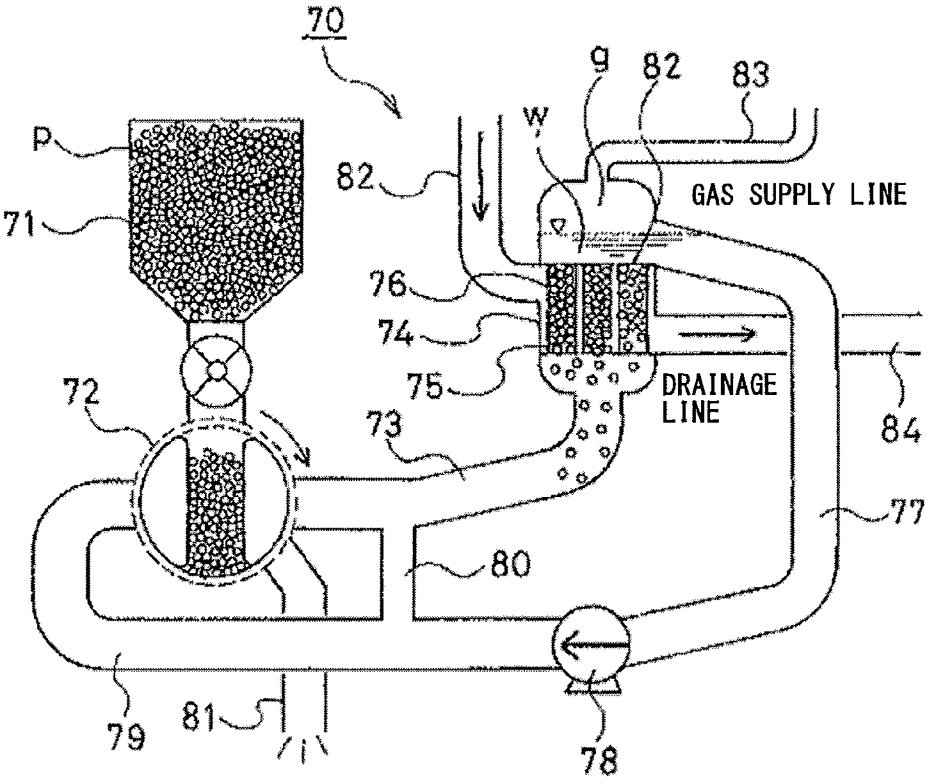
FIG. 2 is a schematic diagram of a regasification device of a second embodiment of the present invention

FIG. 2 shows a regasification device 70 according to a second embodiment of the invention. A pellet supply rotary valve 72 is disposed below a storage tank 71 for pellets p. The pellets p are to be supplied intermittently through piping 73 connected to the rotary valve 72 to a decomposition vessel 74, where the pellets p are subjected to a decomposition treatment. The configuration is as follows. Specifically, the decomposition vessel 74 has decomposition chambers 76 each provided with a jacket 75. The pellets p fed through the rotary valve 72 are heated and decomposed in the decomposition chambers 76, and separated into water w and gas g. The water w is supplied again to an upstream side of the rotary valve 72 through piping 77, a pump 78, and piping 79. The water w transfers the pellets p, which are let out with the rotational operation of the rotary valve 72, into the piping 73. Note that reference sign 80 denotes a bypass pipe, and reference sign 81 denotes a pellet discharge pipe.

A supply pipe 82 for hot water, which is a high heat source, is connected to the decomposition vessel 74. The high-temperature water is supplied to the jackets 75, and heats the decomposition chambers 76 from the peripheral thereof. A screen 82 is provided at a top portion of the decomposition chambers 76. The water w is configured to prevent non-decomposed pellets p from being discharged with the water w, and to enable the pellets p to be heated and decomposed completely in an efficient manner upon reception of heat from the jacket 75.

The flows in the decomposition chambers 76 are accelerated by the generated gas g. Moreover, bubbles pass near inner surfaces, and the turbulent flow effect thereof leads to active heat transfer with the high-temperature water supplied through the supply pipe 82. In addition, in this configuration, the gas g separated in the decomposition vessel 74 is fed through a gas supply line 83 to a destination where the gas g is used.

Figure 3:
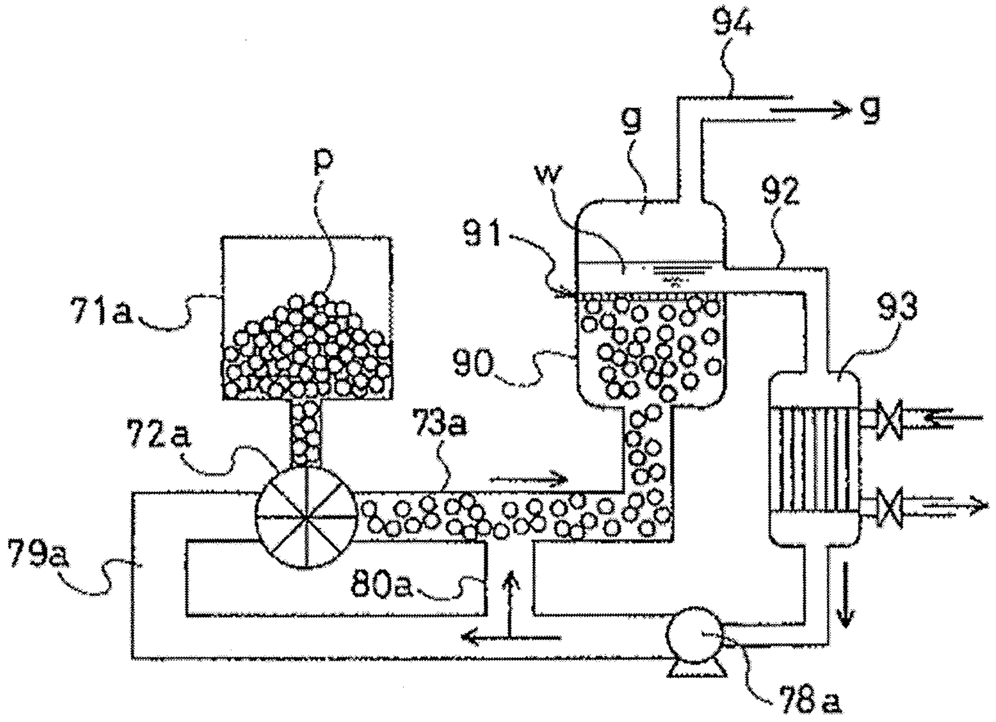
FIG. 3 is a schematic diagram of a regasification device of a third embodiment of the present invention
Figure 4:
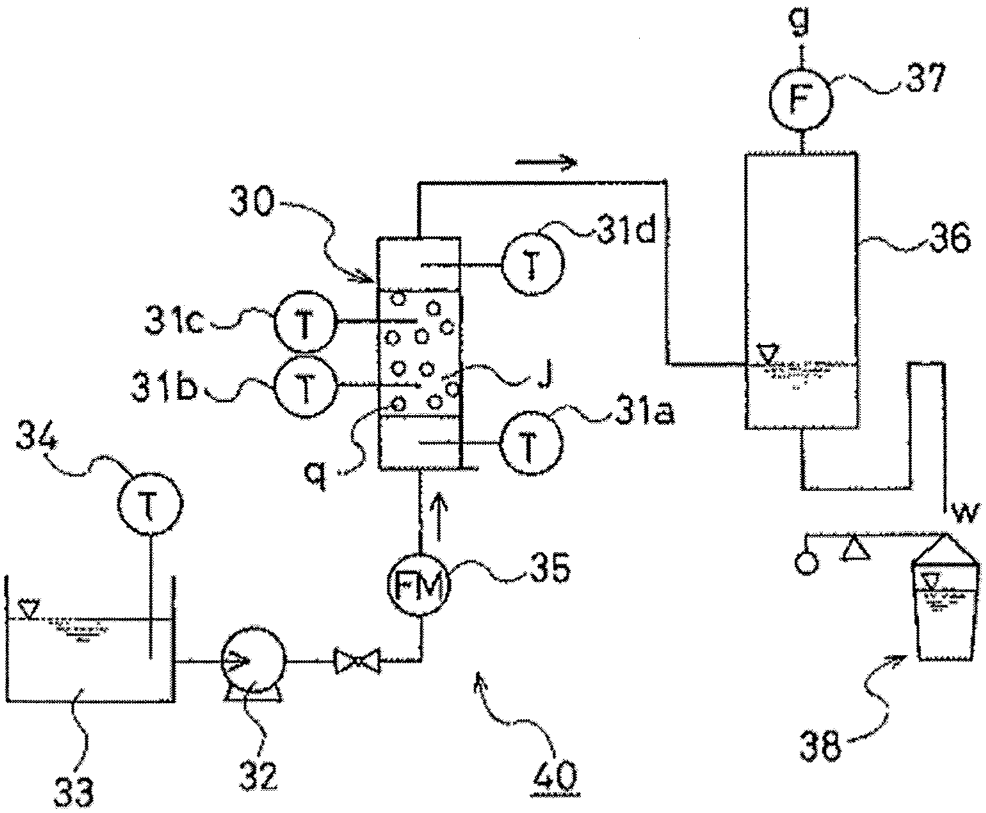
FIG. 4 is a schematic diagram of an experimental device for gasification of pellets.
Figure 5:
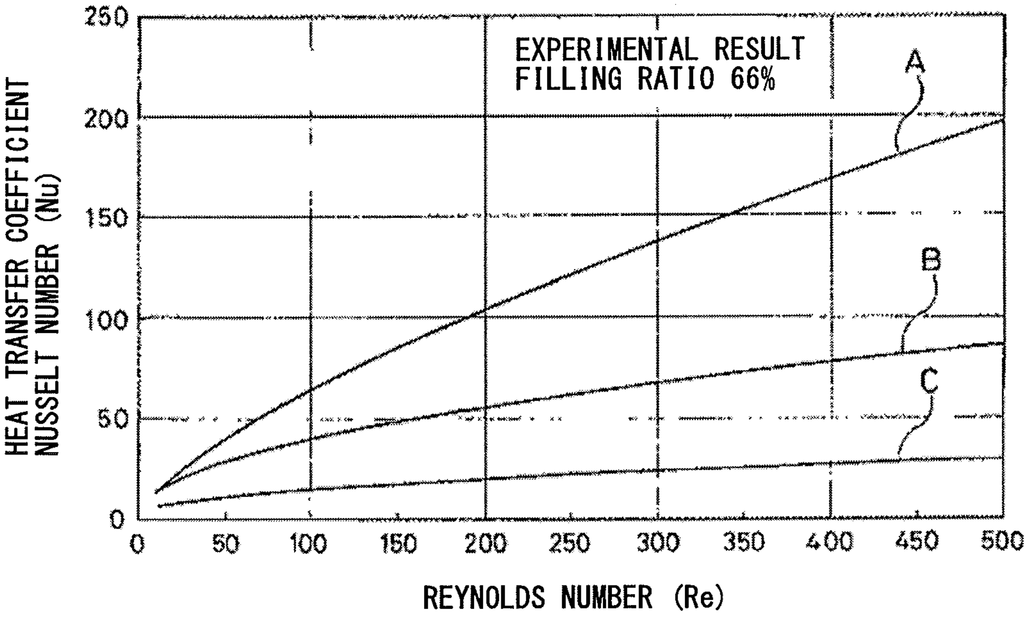
FIG. 5 is a graph showing experimental data on Reynolds number and heat transfer coefficient.
Figure 6:
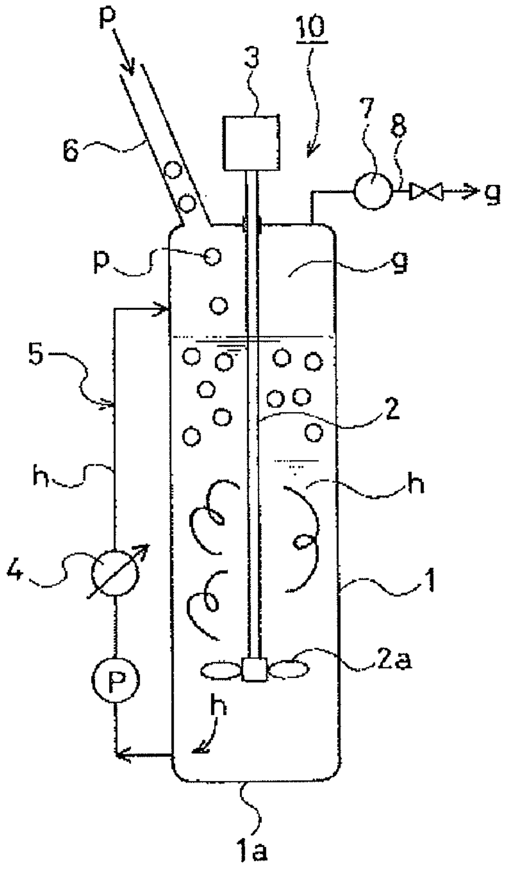
FIG. 6 is a schematic diagram of a conventional stirring-type regasification device.
Figure 7:
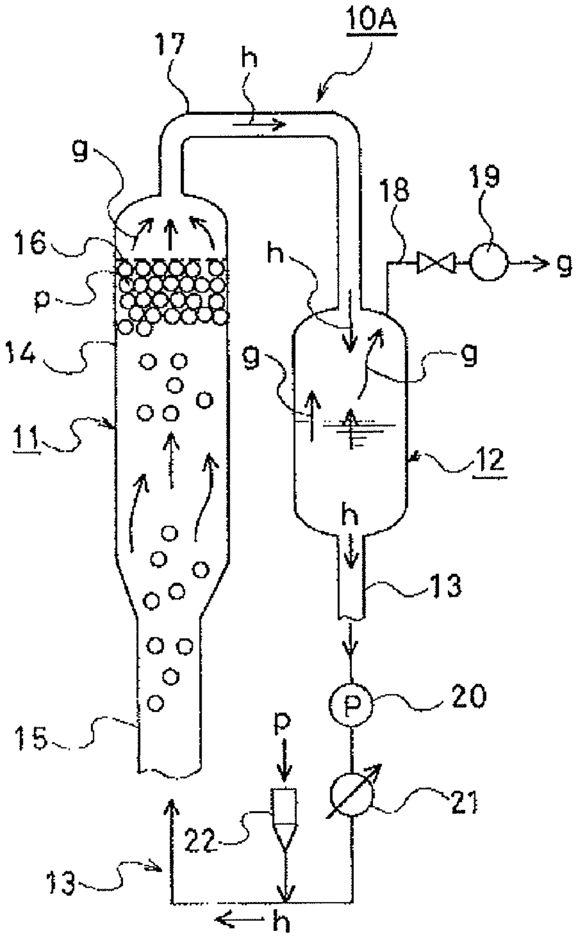
FIG. 7 is a schematic diagram of a regasification device of a densely gathered pellet type according to the present invention.
Figure 8:
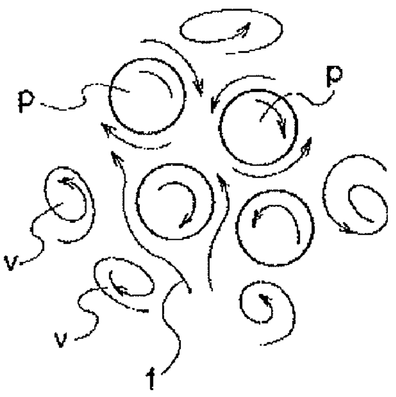
FIG. 8(A) is a diagram for illustrating a state of decomposition in the stirring-type regasification device.
FIG. 8(B) is a diagram for illustrating a state where heat transfer is carried out by forcibly passing hot water through spaces among pellets in the regasification device of the densely gathered pellet type.
Figure 8:
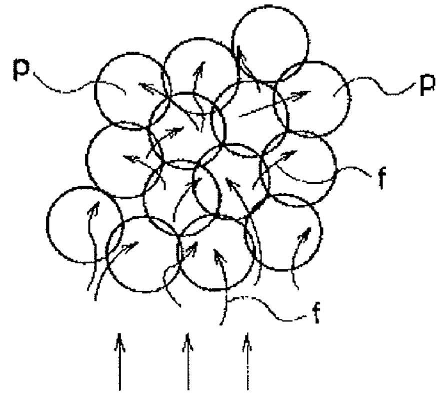

FIG. 3 shows a third embodiment of the invention. An apparatus similar to the pellet storage tank 71 in FIG. 2 is denoted by "71*a*," with the alphabet letter "a" being added. In the second embodiment shown in FIG. 2, the "heating means-integrated-type" decomposition vessel 74 is shown, in which the jackets 75 are provided inside the decomposition vessel 74. In contrast, the embodiment shown in FIG. 3 is configured as follows. Specifically, an external heater 93 is provided, and water w discharged from a decomposition vessel 90 (filling tank) provided with a screen 91 is supplied to the external heat exchanger 93 through piping 92. The water w is heated to a predetermined temperature by this external heat exchanger 93. The obtained hot water is returned to a circulation path 79*a* by a pump 78*a*. In addition, the gas g generated in the decomposition vessel 90 is fed through a gas supply line 94 to a destination where the gas g is used.

INDUSTRIAL APPLICABILITY

In a case where gas g is extracted by decomposing gas hydrate NGH, and the gas g is used as a fuel or a raw material, the present invention makes it possible to decompose the gas hydrate NGH much more efficiently than the conventional stirrer-type decomposition device, as described above. Hence, the present invention makes it possible to supply gas g in an energy-saving manner, and to reduce the size of the device.

The invention claimed is:

1. A method for decomposing gas hydrate pellets into water and gas, the method comprising the steps of:

supplying gas hydrate pellets to a decomposition vessel having a lower part and an upper part and passing hot water continuously through the decomposition vessel;

supplying the gas hydrate pellets underneath a screen which is provided in the decomposition vessel and using the screen to prevent vertical movements of the gas hydrate pellets;

passing hot water from the lower part to the upper part of the decomposing vessel and controlling the amount of flow of the hot water to achieve and maintain a state in which multiple gas hydrate pellets are in contact with each other and the relative positions of the pellets with respect to the decomposition vessel are almost fixed;

passing hot water through narrow spaces formed among the gas hydrate pellets; and decomposing the gas hydrate pellets by contact between the gas hydrate pellets and the hot water.

2. The method for decomposing gas hydrate pellets according to claim 1, further comprising the step of:

controlling the flow amount of hot water which passes through the decomposing vessel by automated flow adjustment valves, which are provided each below and above the decomposing vessel.

3. The method for decomposing gas hydrate pellets according to claim 1, wherein the step of supplying the gas hydrate pellets underneath a screen further comprises using the screen to gather the pellets densely in a clustered state to form the narrow spaces through which hot water is passed in the step of passing hot water through narrow spaces.

4. A method for decomposing gas hydrate pellets into water and gas using a decomposition vessel having a lower part, an upper part, and a screen disposed at the upper part, the method comprising the steps of:

supplying gas hydrate pellets to the decomposition vessel underneath the screen;

passing hot water through the decomposition vessel from the lower part to the upper part and through narrow spaces formed among the gas hydrate pellets;

using the screen to prevent upward vertical movements of the gas hydrate pellets while controlling the amount of flow of the hot water to achieve and maintain a state in which multiple gas hydrate pellets are in contact with each other and the relative positions of the pellets with respect to the decomposition vessel are almost fixed; and
decomposing the gas hydrate pellets by contact between the gas hydrate pellets and the hot water.

* * * * *